Figure 1:
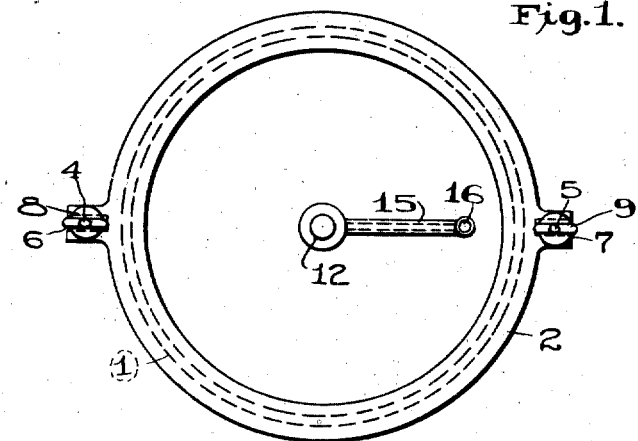
Figure 2:
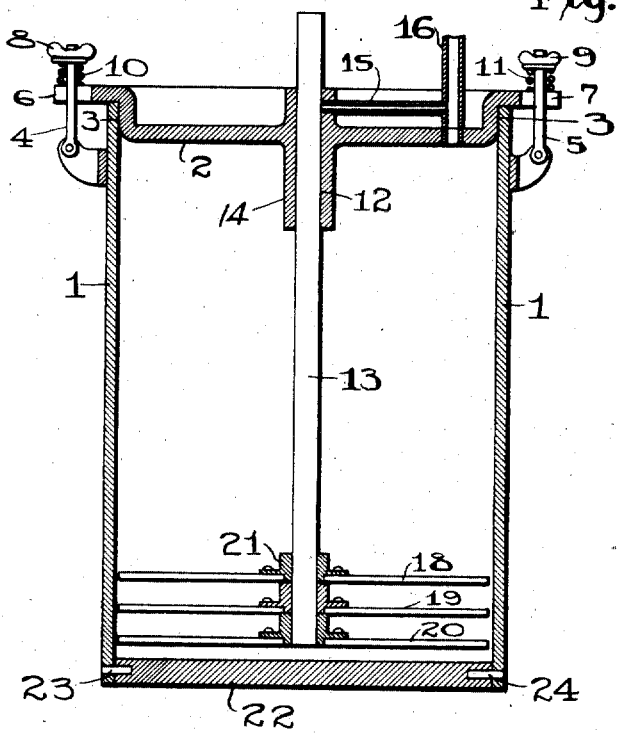
Figure 3:
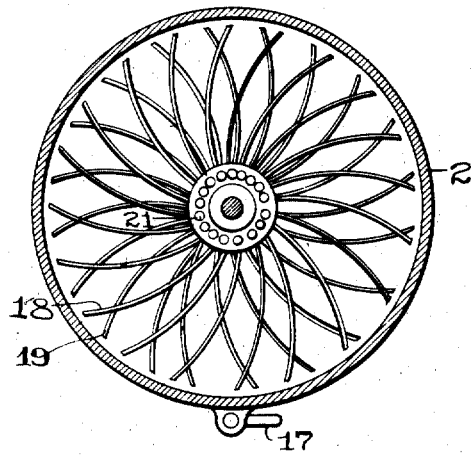
Figure 4:
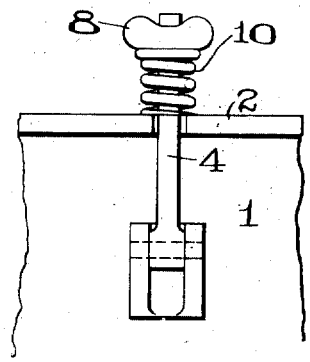
Figure 5:
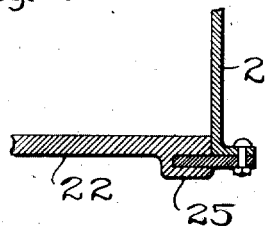
Figure 6:
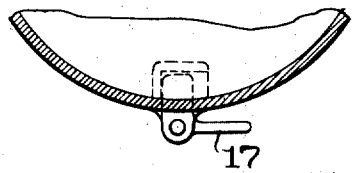

D. C. PARKS.
CEREAL MACHINE.
APPLICATION FILED JUNE 25, 1915.

1,213,245.

Patented Jan. 23, 1917.
2 SHEETS—SHEET 1.

WITNESSES

INVENTOR
DAVID C. PARKS
By Adam E. Fisher
ATTY.

D. C. PARKS.
CEREAL MACHINE.
APPLICATION FILED JUNE 25, 1915.

1,213,245.

Patented Jan. 23, 1917.
2 SHEETS—SHEET 2.

WITNESSES
C. B. Yoder
H. C. Brockhoff

INVENTOR
DAVID C. PARKS
By Adam E. Fisher
ATTY.

UNITED STATES PATENT OFFICE.

DAVID C. PARKS, OF NEAR KIMMSWICK, MISSOURI.

CEREAL-MACHINE.

1,213,245.   Specification of Letters Patent.   Patented Jan. 23, 1917.

Application filed June 25, 1915. Serial No. 36,351.

*To all whom it may concern:*

Be it known that I, DAVID C. PARKS, a citizen of the United States, residing near the town of Kimmswick, Jefferson county, State of Missouri, have invented new and useful Improvements in Cereal-Machines, of which the following is a specification, reference being had to the accompanying drawings.

My invention relates to devices for preparing cereals and similar foods in palatable and digestible form for the human stomach, and has for its main object the production of a machine for this purpose by which cereals may be reduced to a meal like form under the combined action of compressed air and a cutting mechanism, provided in my improvement, whereby the vital elements of the cereals are all preserved and prepared in the most palatable and digestible form for eating.

Another object is the production of such machine in a simple, practical and efficient form, the best calculated to do the required work.

With these and other objects in view attention is called to the accompanying drawings to be considered in connection with this specification wherein:

Figure I represents a plan view of the top of my device. Fig. II, a sectional side view taken through the center of the machine. Fig. III, a detailed plan view showing the arrangement of the blades. Fig. IV, a detail showing method of locking the top of the barrel of the machine. Fig. V, a detail showing method of pivoting the bottom of the machine. Fig. VI, a detail showing method of locking the bottom in position and for releasing same when desired.

Referring more particularly to the drawings, 1 represents the barrel of my machine same being formed cylindrically and hollow in the manner of a churn. Into the top of this barrel 1 is locked the cover 2, the same setting within an offset formed at the upper periphery of the barrel 1, said offset being shown at 3, and the cover 2 being lockable in position by means of the bolts 4 and 5 projecting upward from the upper portion of the barrel 1 through the holes 6 and 7 formed through the cover 2; threads being turned at the upper ends of said bolts and thumb screws 8 and 9 being fitted thereto; springs 10 and 11 made of coil spring wire encircle the bolts immediately above the cover 2 to hold the same firmly in place when the thumb screws 8 and 9 are turned down.

Through the center of the cover 2 is formed the hole 12 for the entrance of the shaft 13 into the barrel 1, and said shaft 13 projects upward through the cover 2 to a suitable distance to facilitate the manipulation of the machine as a whole. The said shaft 13 in passing up through the cover 2 passes through a closely fitting sleeve or bearing 14, the lower end of which projects interiorly of the barrel 1, while the upper end extends above the cover 2 for a sufficient distance to receive the auxiliary compressed air tube 15, which in turn connects with the compressed air intake tube 16, the latter at its lower end opening directly into the barrel 1. The auxiliary air tube 15 may be dispensed with if desired, without materially affecting the operation of my machine.

At the lower end of the shaft 13 is arranged a series of cutting knives 18, 19 and 20 radiating from the support 21 anchored upon the main shaft 13; said cutting knives being turned and formed in such manner that the several series of knives cross one another in diverse directions. These knives are made from thin knife steel and are sharpened on their lower edges. The bottom 22 is pivotally mounted within the lower end of the barrel 1 upon the pivots 23 and 24 located diametrically opposite one another at the lower edge or periphery of the barrel 1. The bottom 22 is lockable in closed position by means of the clutch 17.

In actual use the cereals desired to be prepared by my improved process and machine are first roasted and then placed within the churn-like barrel of the machine. Warm water is then poured into the barrel 1 to barely cover the cereals contained. The action of the water is to soften the cereals so as to facilitate the work of the cutting blades 18, 19 and 20. Compressed air is forced into the barrel 1 and up to and around the shaft 13 where it passes through the sleeve 14 through the intake tube 16 and the auxiliary tube 15. The purpose of the compressed air as fed through the tube 15 is to afford a counteracting and balancing pressure downward against the upward pressure of the compressed air inside the barrel 1 as fed through the intake tube 16 and thus in a measure prevent the escape of the compressed air through the bearing 12, surrounding the shaft 13. By any suitable power as hand or machine power the shaft 13 is reciprocated in a vertical direction and is forcibly thrust downward upon the cereal mass causing the sharp blades 18, 19 and 20 to cut and reduce the softened cereals to a meal like form. At the same time compressed air is admitted through the tube 16 into the barrel 1, which air intermingling with the meal like and water softened cereals causes the cereal mass to puff and distend itself when it is brought into contact with the normal atmospheric pressure, whereby it is rendered very palatable and digestible, all the vital elements of the food being retained for utilization by the human system when eaten. This is due to the fact that the meal like particles of the cereal are extremely porous and absorb both water and air, and the air in the tank being under pressure, it expands when released and that portion of the air contained in the pores of the meal like particles naturally distends and enlarges the particles by its expansion when the tank is opened. No further cooking or preparation of the cereals is required or best, but same are ready to be served instantly upon being taken from my machine after being so treated.

It will be noted that the cereals to be prepared are put in at the top of the machine by removing the cover 2 as shown, and after being prepared they are readily discharged from the machine by swinging the bottom portion 22 upon the pivots 23 and 24 after releasing the clutch 27.

Although I have herein described certain specific manner and method of constructing and assembling the elements of my invention, I reserve the right to modify same in minor details not departing from the spirit of my invention so as best to construct my improved puffer to meet all practical demands.

Having thus described my invention what I claim as new and patentable is:

1. A machine for reducing cereals to a meal like form, comprising a closed hollow cylindrical container, having a central bearing in its top, a shaft mounted in said bearing and adapted to reciprocate therein, a series of cutting knives carried at the lower end of said shaft, and means for admitting compressed air to the interior of said container.

2. A machine for reducing cereals to a meal like form, comprising a closed hollow cylindrical container, having a central bearing in its top, a shaft mounted in said bearing and adapted to reciprocate therein, a series of cutting knives carried at the lower end of said shaft, and a tube connected to a suitable source for supplying compressed air to the interior of said container.

3. In a machine for reducing cereals to a meal like form, a hollow container having a cylindrical body and a top cover removably fastened upon said body, a long central sleeve in said cover forming a bearing, a shaft mounted in said bearing and adapted to reciprocate therein, and a series of cutting knives carried at the lower end of said shaft.

4. In a machine for reducing cereals to a meal like form, a hollow container having a cylindrical body and a top cover removably fastened upon said body, a long central sleeve in said cover forming a bearing, a shaft mounted in said bearing and adapted to reciprocate therein, a tubular support on the lower end of said shaft and a series of cutting knives radiating horizontally from said support.

5. In a machine for reducing cereals to a meal like form, a hollow container having a cylindrical body, a bottom pivotally mounted in said body and a removable top cover, means for locking the bottom in closed position, spring means for resiliently locking the top cover in place, a long central sleeve in the cover forming a bearing, a shaft mounted in said sleeve and adapted to reciprocate therein, said shaft extending within the container, a tubular support on the lower end of said shaft, a series of cutting knives radiating from said support and arranged in horizontal rows, said knives having their lower edges sharpened, and a tube arranged in the cover for admitting compressed air to the interior of the container.

DAVID C. PARKS.

Witnesses:
JOHN STETTIN,
MARTHA her X mark PARK.
Witness to mark:
HENRY MARX, Sr.